(12) United States Patent
Nikula et al.

(10) Patent No.: US 9,307,061 B2
(45) Date of Patent: Apr. 5, 2016

(54) FLEXIBLE ELECTRONIC APPARATUS

(75) Inventors: Jarmo Antero Nikula, Jaali (FI); Mika Allan Salmela, Oulu (FI); Jyrki Veikko Leskela, Haukipudas (FI); Aki Happonen, Kiiminki (FI)

(73) Assignee: Nokia Technologies Oy, Espoo (FI)

( * ) Notice: Subject to any disclaimer, the term of this patent is extended or adjusted under 35 U.S.C. 154(b) by 1269 days.

(21) Appl. No.: 13/106,581

(22) Filed: May 12, 2011

(65) Prior Publication Data

US 2012/0287557 A1 Nov. 15, 2012

(51) Int. Cl.
| | |
|---|---|
| *H05K 5/00* | (2006.01) |
| *H04M 1/02* | (2006.01) |
| *G06F 1/16* | (2006.01) |
| *G09F 9/30* | (2006.01) |

(52) U.S. Cl.
CPC ........... *H04M 1/0268* (2013.01); *G06F 1/1626* (2013.01); *G06F 1/1652* (2013.01); *G06F 1/1675* (2013.01); *G06F 1/1677* (2013.01); *G09F 9/301* (2013.01); *H04M 1/0266* (2013.01); *Y10T 428/24025* (2015.01); *Y10T 428/24996* (2015.04); *Y10T 428/249923* (2015.04)

(58) Field of Classification Search
CPC ..... G06F 1/1618; G06F 1/162; G06F 1/1652; G06F 1/1679; G06F 1/1675; G06F 1/1626; G06F 1/1677; H04M 1/0216; H04M 1/0222; H04M 1/0212; H04M 1/0268; H04M 1/0266; Y10T 428/24025; Y10T 428/249923; Y10T 428/24996
USPC ............................................ 361/679.27, 755
See application file for complete search history.

(56) References Cited

U.S. PATENT DOCUMENTS

| | | | | |
|---|---|---|---|---|
| 815,458 | A | | 3/1906 | Morris |
| 2,625,946 | A | * | 1/1953 | Kaston et al. ................. 135/20.2 |
| 2,865,446 | A | * | 12/1958 | Cole ................................ 160/85 |
| 3,759,277 | A | * | 9/1973 | Glade ............................. 135/95 |
| 5,128,662 | A | * | 7/1992 | Failla .............................. 345/1.3 |
| 5,553,339 | A | * | 9/1996 | Thomas ..................... 5/413 AM |
| 5,664,613 | A | * | 9/1997 | Jelic ............................ 160/84.05 |
| 5,778,915 | A | * | 7/1998 | Zheng ........................... 135/126 |
| 5,816,954 | A | * | 10/1998 | Zheng ........................... 473/471 |
| 6,144,550 | A | * | 11/2000 | Weber et al. ............. 361/679.26 |
| 6,357,510 | B1 | * | 3/2002 | Zheng ........................... 160/354 |
| 6,484,786 | B1 | * | 11/2002 | Ruggles et al. ............ 160/84.05 |

(Continued)

FOREIGN PATENT DOCUMENTS

| | | |
|---|---|---|
| GB | 191500615 | 0/1915 |
| GB | 2378564 A | 2/2003 |

(Continued)

OTHER PUBLICATIONS

"Nokia Morph Concept", http://research.nokia.com/morph, Copyright 2010, downloaded Apr. 21, 2011, 3 pages.

(Continued)

*Primary Examiner* — Michael E La Villa
(74) *Attorney, Agent, or Firm* — Locke Lord LLP

(57) ABSTRACT

An apparatus with a first flexible layer and at least one adjustment member attached to the first flexible layer. The adjustment member is movable between a first configuration and a second configuration. In the first configuration, the adjustment member is configured to allow flexibility of the apparatus, and in the second configuration, the adjustment member is configured to restrict flexibility of the apparatus.

19 Claims, 8 Drawing Sheets

(56) References Cited

U.S. PATENT DOCUMENTS

| | | | |
|---|---|---|---|
| 6,637,896 B2* | 10/2003 | Li et al. | 353/119 |
| 6,771,237 B1* | 8/2004 | Kalt | 345/85 |
| 6,839,922 B1 | 1/2005 | Foggett et al. | |
| 7,686,060 B2* | 3/2010 | Anthony | 160/121.1 |
| 7,782,274 B2* | 8/2010 | Manning | 345/1.3 |
| 8,271,047 B2* | 9/2012 | Kim et al. | 455/566 |
| 8,369,075 B2* | 2/2013 | Huang | 361/679.21 |
| 8,508,433 B2* | 8/2013 | Manning | 345/1.3 |
| 8,539,705 B2* | 9/2013 | Bullister | 40/733 |
| 2004/0183958 A1 | 9/2004 | Akiyama et al. | |
| 2006/0038745 A1 | 2/2006 | Naksen et al. | |
| 2006/0144434 A1* | 7/2006 | Chen | 135/144 |
| 2007/0279315 A1* | 12/2007 | Laves et al. | 345/1.1 |
| 2008/0212271 A1 | 9/2008 | Misawa | |
| 2009/0235965 A1 | 9/2009 | Kupferman | |
| 2010/0018743 A1 | 1/2010 | Touwslager et al. | |
| 2010/0120470 A1 | 5/2010 | Kim et al. | |
| 2010/0208417 A1 | 8/2010 | Visser et al. | |
| 2010/0261012 A1 | 10/2010 | Huang et al. | |
| 2010/0324370 A1 | 12/2010 | Dohi et al. | |
| 2011/0031289 A1 | 2/2011 | Haskell et al. | |

FOREIGN PATENT DOCUMENTS

| | | |
|---|---|---|
| JP | 2007156125 | 6/2007 |
| KR | 20080001189 A | 1/2008 |
| WO | WO2004114259 | 12/2004 |
| WO | WO2010041227 | 4/2010 |

OTHER PUBLICATIONS

"Nokia 888", http://hubpages.com/hub/Nokia-888, downloaded Apr. 21, 2011, 2 pages.

"Concept Phones", http://www.concept-phones.com/tag/flexible-display/, downloaded Apr. 21, 2011, 21 pages.

"Nokia patents innovative new flexible display technology", http://www.geek.com/articles/mobile/nokia-patents-innovative-new-flexible-display-technology-20100119, downloaded Apr. 21, 2011, 6 pages.

International Search Report for International Application No. PCT/FI2012/050411—Date of Completion of Search: Aug. 29, 2012—5 pages.

Written Opinion of the International Searching Authority for International Application No. PCT/FI2012/050411—Date of Completion of Opinion: Aug. 29, 2012—8 pages.

Extended European Search Report for EP App. No. 12782245.0—Date of Completion of Search: Sep. 2, 2014—6 pages.

English Language Machine Translation of Japanese Patent Application Publication No. 2007/156125, 20 pages.

* cited by examiner

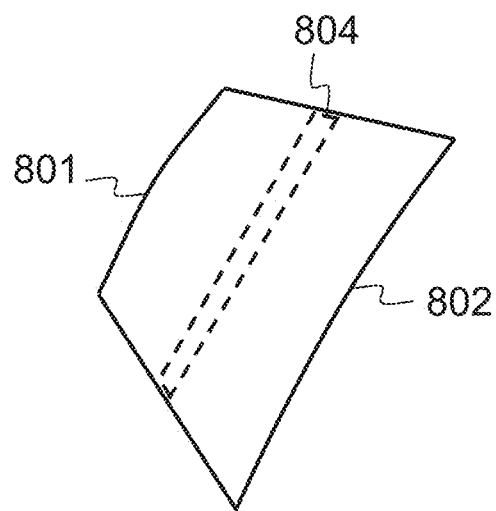
Fig. 8
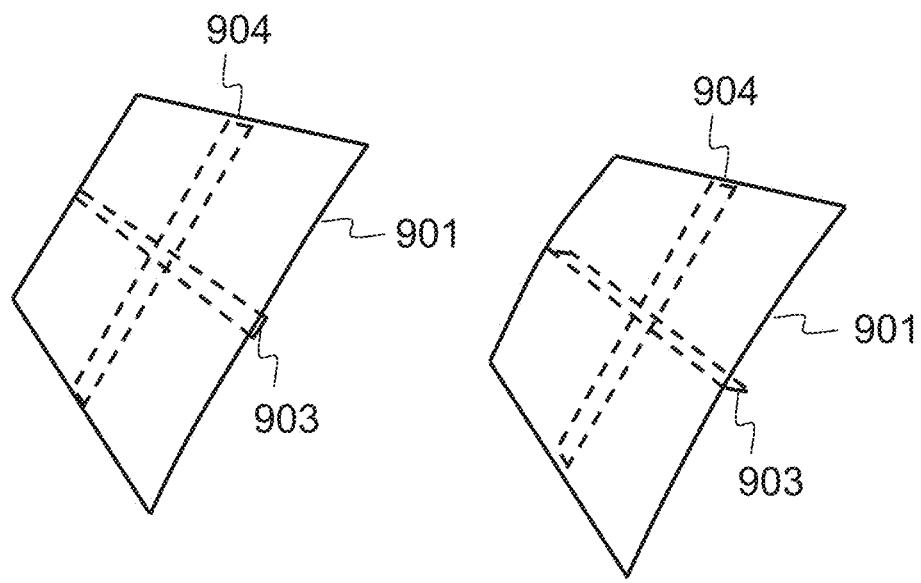
Fig. 9A
Fig. 9B

FLEXIBLE ELECTRONIC APPARATUS

TECHNICAL FIELD

The present application relates generally to a flexible electronic apparatus.

BACKGROUND

There are versatile possibilities to construct end user electronic devices. For example flexible components can be used.

SUMMARY

Various aspects of examples of the invention are set out in the claims.

According to a first aspect of the invention there is provided an apparatus, comprising:
a first flexible layer, and
at least one adjustment member attached to the first flexible layer, wherein the adjustment member is movable between a first configuration and a second configuration and wherein
in the first configuration, the adjustment member is configured to allow flexibility of the apparatus, and
in the second configuration, the adjustment member is configured to restrict flexibility of the apparatus.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

BRIEF DESCRIPTION OF THE DRAWINGS

For a more complete understanding of example embodiments of the present invention, reference is now made to the following descriptions taken in connection with the accompanying drawings in which:

FIG. 8 shows an apparatus according to an embodiment of the invention in a second configuration;
FIG. 9A shows an apparatus according to an embodiment of the invention in a first configuration;
FIG. 9B shows an apparatus according to an embodiment of the invention in a second configuration.

DETAILED DESCRIPTION

Example embodiments of the present invention and their potential advantages are understood by referring to FIGS. 1 through 11 of the drawings. In the following description, like numbers denote like elements.

In an example embodiment of the invention there is provided an apparatus with adjustable flexibility.

In an example embodiment of the invention the apparatus can be used in a first configuration and a second configuration. In the first configuration the apparatus is flexible and in the second configuration the apparatus is rigid or the flexibility is at least restricted.

In an example embodiment there is provided an apparatus that comprises a first flexible layer and at least one adjustment member attached to the first flexible layer. The adjustment member is movable between a first configuration and a second configuration. In the first configuration, the adjustment member is configured to allow flexibility of the apparatus, and in the second configuration, the adjustment member is configured to restrict flexibility of the apparatus.

In an example embodiment, in the second configuration, the adjustment member is configured to make at least one dimension of the first flexible layer rigid.

In an example embodiment, the apparatus further comprises a second flexible layer and the adjustment member resides between the first flexible layer and the second flexible layer.

In an example embodiment, the first flexible layer and the second flexible layer are at least partially connected to each other with an elastic connection.

In an example embodiment, the apparatus comprises more than one adjustment members.

In an example embodiment, the adjustment member is configured to bend at least one of the first and the second flexible layers in the second configuration.

In an example embodiment, the adjustment member is configured to adjust distance between the first flexible layer and the second flexible layer.

In an example embodiment, the adjustment member is configured to adjust distance between the first flexible layer and the second flexible layer so that the distance between the first flexible layer and the second flexible layer is larger in the second configuration than in the first configuration.

In an example embodiment components or layers of the apparatus are flexible. In another example embodiment, all components need not be fully flexible. In an embodiment at least one of the components of the apparatus is constructed from small rigid pieces that are connected to each other to form a flexible structure. In an embodiment the rigid parts are connected to each other with elastic material. For example battery can be constructed in this way.

Figure 1A:
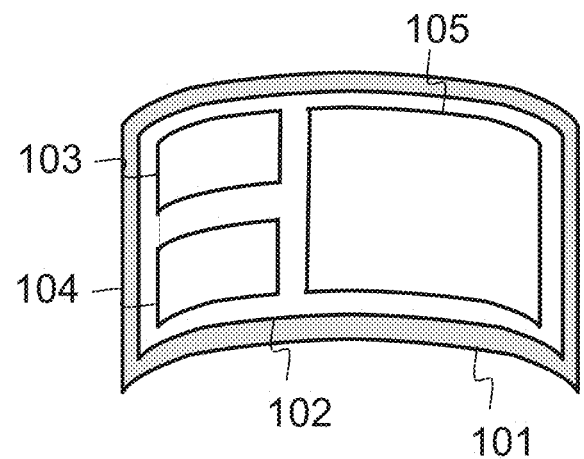
FIG. 1A shows an apparatus according to an embodiment of the invention in a first configuration.

FIG. 1A shows an apparatus 101 according to an embodiment of the invention. The apparatus 101 can be for example a mobile phone or some other end user electronic device.

The apparatus 101 comprises a display element 102. In the shown example, the display 102 shows items 103-105. The apparatus 101 is shown in a first configuration, wherein the apparatus 101 is flexible. The flexible configuration allows that the apparatus 101 has been bent to form an arc.

Figure 1B:
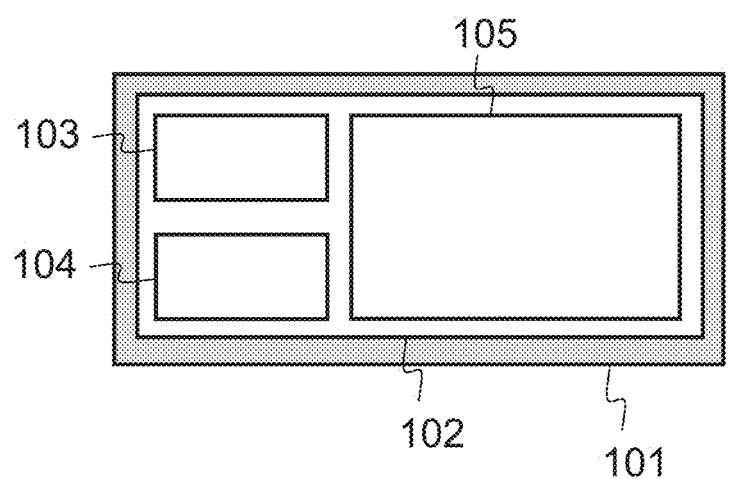
FIG. 1B shows an apparatus according to an embodiment of the invention in a second configuration.

FIG. 1B shows the apparatus 101 of FIG. 1A in a second configuration, wherein the apparatus 101 is rigid. The rigid configuration prevents the apparatus from being bent the same way as in the flexible configuration.

Figure 2A:
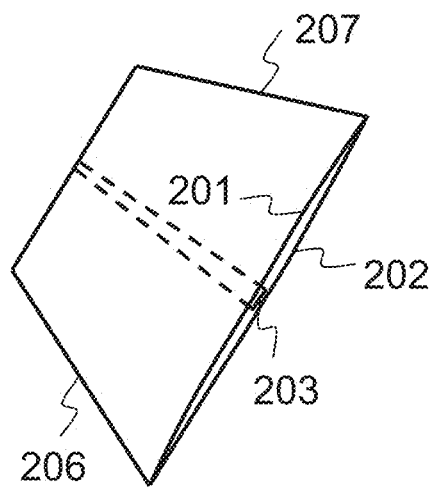
FIG. 2A shows an apparatus according to an embodiment of the invention in a first configuration.

FIG. 2A shows an apparatus according to an embodiment of the invention in a first configuration. The apparatus can be the apparatus 101 of FIGS. 1A and 1B or some other apparatus.

The apparatus comprises a first flexible layer 201 and a second flexible layer 202 and an adjustment member 203 between the layers 201 and 202. Elastic connections 206 and 207 attach the first 201 and the second 202 layers to each other at two opposite edges of the apparatus. For example elastomers can be used for providing the elastic connection. In an embodiment the elastic connection comprises electronic connections formed by means of conductive elastomers or flexible wiring. In an example embodiment the first layer 201 is a display layer and the second layer 202 is a back layer. In the shown example the adjustment member 203 is an adjustment bar. In the shown first configuration the adjustment bar 203 is flat between the first 201 and the second 202 layers. The first 201 and the second 202 layers are close to each other. The small distance between the first 201 and the second 202 layers allows flexibility of the apparatus whereby the apparatus can be bent.

Figure 2B:
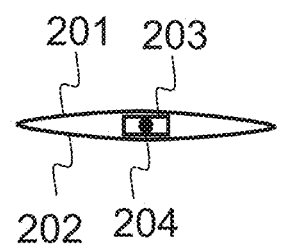
FIG. 2B shows a side view of the apparatus of FIG. 2A.

FIG. 2B shows a side view of the apparatus of FIG. 2A. The adjustment member 203 is turnable around axle 204. The adjustment member 203 has a rectangular profile.

Figure 2C:
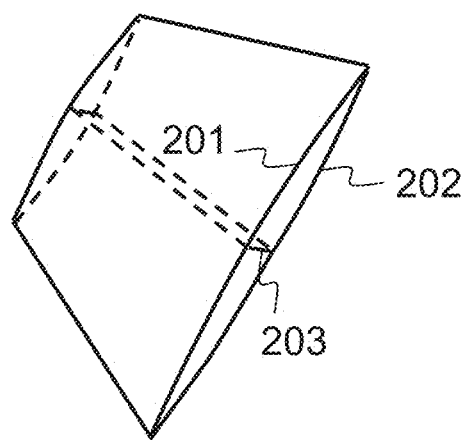
FIG. 2C shows an apparatus according to an embodiment of the invention in a second configuration.

FIG. 2C shows the apparatus of FIG. 2A in a second configuration. The adjustment member 203 has been turned 90 degrees so that distance between the first 201 and the second 202 layers increases and the apparatus structure bloats. The bloated structure makes the apparatus rigid and non-bendable or at least restricts flexibility of the apparatus.

Figure 2D:
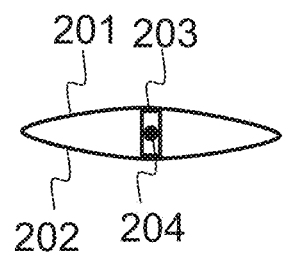
FIG. 2D shows a side view of the apparatus of FIG. 2C.

FIG. 2D shows a side view of the apparatus of FIG. 2C. Therein it is shown that the adjustment member 203 has been turned 90 degrees around the axle 204 from the position shown in FIG. 2B.

Figures 3A, 3B, 3C:
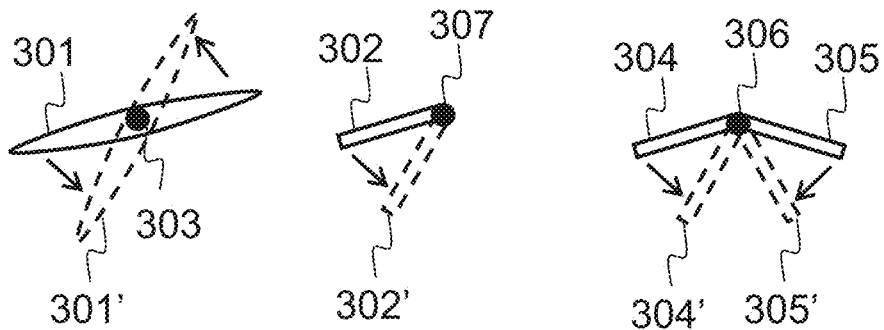
FIG. 3A shows a side view an adjustment member according to an embodiment of the invention.
FIG. 3B shows a side view an adjustment member according to another embodiment of the invention.
FIG. 3C shows a side view an adjustment member according to yet another embodiment of the invention.

Instead of rectangular form of adjustment member 203 also other forms may be used. Some examples are shown in FIG. 3A-3C. The adjustment member in FIGS. 3A-3C may be an adjustment bar or an adjustment snippet, for example. It must be noted that the adjustment bar does not need to have equal length compared to the apparatus length. In an example embodiment the adjustment bar is shorter than the apparatus and in another example embodiment the adjustment bar comprises several shorter bars.

FIG. 3A shows a side view of an adjustment member 301 according to an embodiment of the invention. The adjustment member 301 comprises curved edges. The adjustment member 301 is turnable around axle 303 into other positions 301'.

FIG. 3B shows a side view of an adjustment member 302 according to another embodiment of the invention. The adjustment member 302 is turnable around axle 307 into other positions 302'. That is, the turning axle 307 is not in the middle of the adjustment member, but in one end of the adjustment member. In an example embodiment, the adjustment member 302 is attached to a flexible layer of an apparatus with a hinge from the turning axle 307.

FIG. 3C shows a side view an adjustment member according to yet another embodiment of the invention. The adjustment member comprises two parts 304 and 305 that are foldable around axle 306 into other positions 304' and 305'.

Figure 4A:
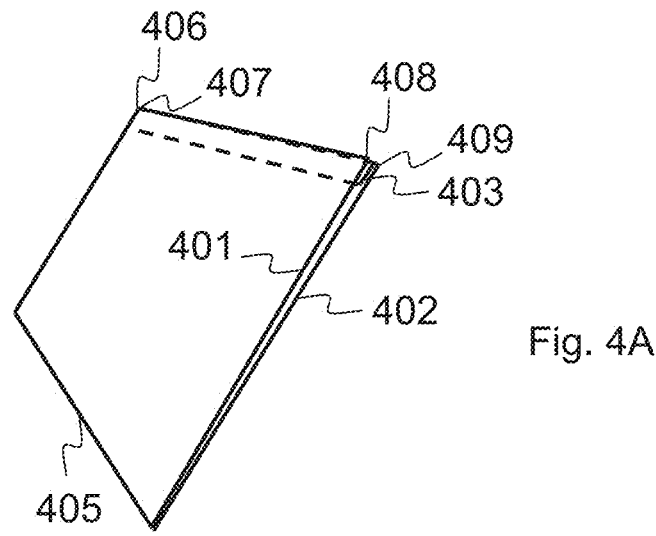
FIG. 4A shows an apparatus according to an embodiment of the invention in a first configuration.

FIG. 4A shows an apparatus according to an embodiment of the invention in a first configuration. The apparatus can be the apparatus 101 of FIGS. 1A and 1B or some other apparatus.

The apparatus comprises a first flexible layer 401 and a second flexible layer 402. Elastic connection 405 attaches the 401 and the second 402 layers to each other at one edge of the apparatus. The opposite edge of the apparatus comprises an adjustment member 403 between the first 401 and the second 402 layers. In the shown example the adjustment member 403 is an adjustment bar. In an example embodiment the adjustment member 403 is attached to the first 401 or the second 402 layer with a hinge. In the shown first configuration the adjustment bar 403 is flat between the first 401 and the second 402 layers and the apparatus is flexible.

Figure 4B:
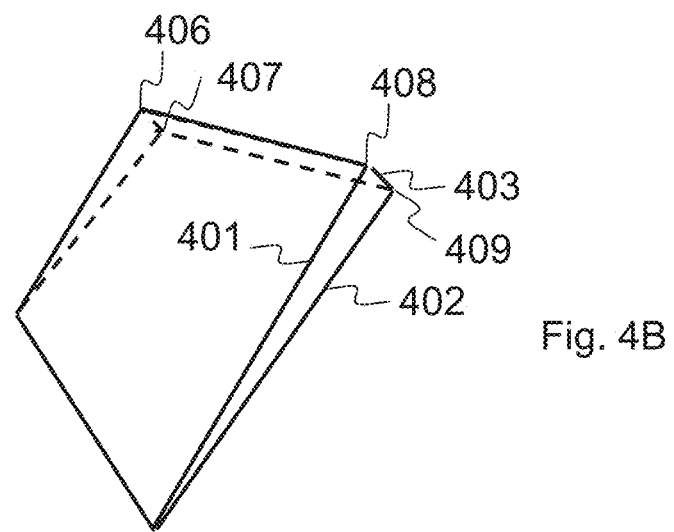
FIG. 4B shows an apparatus according to an embodiment of the invention in a second configuration.

FIG. 4B shows the apparatus of FIG. 4A in a second configuration. The adjustment member 403 has been turned so that the apparatus becomes rigid or at least flexibility of the apparatus is restricted.

In an example embodiment the apparatus of FIGS. 4A and 4B comprises sliding grips that are configured to prevent the first 401 and the second 402 layers from slipping away from each other. In an alternative embodiment, the apparatus of FIGS. 4A and 4B comprises elastic connections between corners 406 and 407 as well as corners 408 and 409. In an example, the elastic connections are made of some suitable rubber-like material, e.g. elastic band may be used. The elastic connections cause a pulling force that pulls the first 401 and the second 402 layers towards each other thereby preventing the first 401 and the second 402 layers from slipping away from each other.

A technical effect of the embodiment of FIGS. 4A and 4B is that if the apparatus surface comprises a display, in the rigid configuration the display is in a suitable viewing angle (slightly tilted) when the apparatus is placed on a table.

In an alternative embodiment an adjustment bar like the adjustment bar 403 of FIGS. 4A and 4B could be placed on two opposite sides of the apparatus. In that case the elastic connection 405 between the layers would not be necessary. In this embodiment it is possible that the flexible layers may become slightly misaligned in the flexible (first) configuration, but the layers would be again aligned when the apparatus is set to the rigid (second) configuration.

In an example embodiment the adjustment member is an adjustment snippet. Such embodiment is discussed in the following.

Figure 5A:
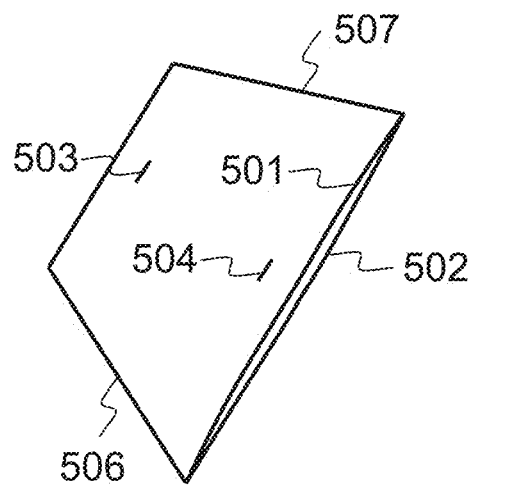
FIG. 5A shows an apparatus according to an embodiment of the invention in a first configuration.

FIG. 5A shows an apparatus according to an embodiment of the invention in a first configuration. The apparatus can be the apparatus 101 of FIGS. 1A and 1B or some other apparatus.

The apparatus comprises a first flexible layer 501 and a second flexible layer 502 and adjustment members 503 and 504 between the layers 501 and 502. Elastic connections 506 and 507 attach the first 501 and the second 502 layers to each other at two opposite edges of the apparatus. In the shown example the adjustment members 503 and 504 are snippets of suitable material. In an example embodiment the adjustment members 503 and 504 are attached to the first 501 or the second 502 layer with hinges. In the shown first configuration the adjustment snippets 503 and 504 are flat between the first 501 and the second 502 layers and the apparatus is flexible.

Figure 5B:
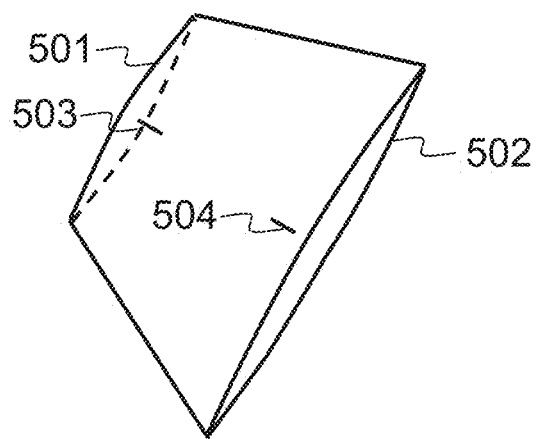
FIG. 5B shows an apparatus according to an embodiment of the invention in a second configuration.

FIG. 5B shows the apparatus of FIG. 5A in a second configuration. The adjustment members 503 and 504 have been turned so that the apparatus becomes rigid or at least flexibility of the apparatus is restricted.

In an example embodiment the adjustment member is a pressure bag. Such embodiment is discussed in the following.

Figure 6A:
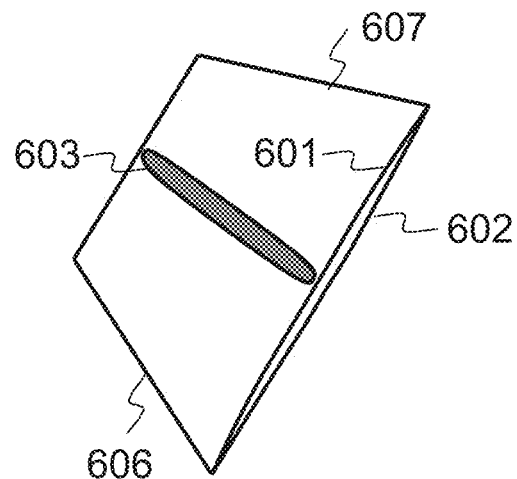
FIG. 6A shows an apparatus according to an embodiment of the invention in a first configuration.

FIG. 6A shows an apparatus according to an embodiment of the invention in a first configuration. The apparatus can be the apparatus 101 of FIGS. 1A and 1B or some other apparatus.

The apparatus comprises a first flexible layer 601 and a second flexible layer 602 and an adjustment member 603 between the layers 601 and 602. Elastic connections 606 and 607 attach the first 601 and the second 602 layers to each other at two opposite edges of the apparatus. In the shown example the adjustment member 603 is a pressure bag. In an example embodiment the pressure bag 603 is attached to the first 601 and/or the second 602 layer. In the shown first configuration the pressure bag 603 is flat (empty, no pressure) between the first 601 and the second 602 layers and the apparatus is flexible.

Figure 6B:
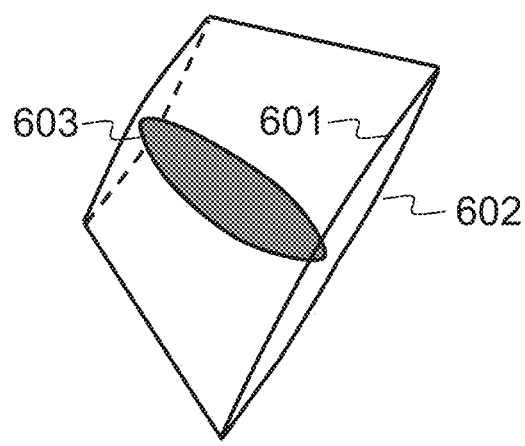
FIG. 6B shows an apparatus according to an embodiment of the invention in a second configuration.

FIG. 6B shows the apparatus of FIG. 6A in a second configuration. The pressure bag 603 has been bloated with pressure so that the apparatus becomes rigid or at least flexibility of the apparatus is restricted.

In an example embodiment the adjustment member is configured to restrict or allow movement of the first flexible layer in relation to the second flexible layer. In an example embodiment in the first configuration, the adjustment member is configured to allow movement of the second flexible layer in relation to the first flexible layer, and in the second configuration, the adjustment member is configured to restrict movement of the second flexible layer in relation to the first flexible layer.

In an example embodiment the apparatus comprises elastic seaming between the first flexible layer and the second flexible layer, and in the first configuration, the adjustment member is configured to allow sideways or parallel movement between the first flexible layer and the second flexible layer, and in the second configuration, the adjustment member is configured to attach the first flexible layer and the second flexible layer to each other so that sideways or parallel movement between the first flexible layer and the second flexible layer is not allowed. Such embodiment is discussed in the following.

Figure 7A:
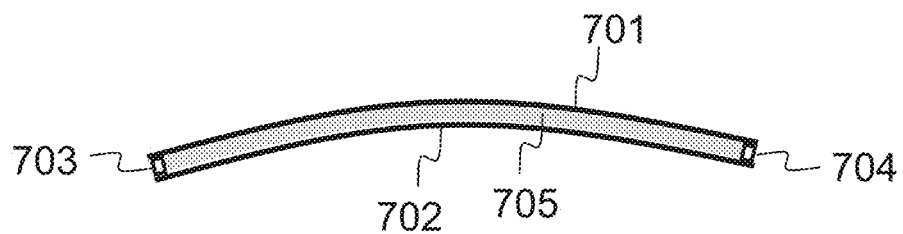
FIG. 7A shows an apparatus according to an embodiment of the invention in a first configuration.

FIG. 7A shows an apparatus according to an embodiment of the invention in a first configuration. The apparatus can be the apparatus 101 of FIGS. 1A and 1B or some other apparatus.

The apparatus comprises a first flexible layer 701 and a second flexible layer 702 and an elastic seaming 705 that connects the layers 701 and 702 to each other. In an example embodiment the distance between the layers 701 and 702 is fixed. In an example embodiment the distance between the layers 701 and 702 is relatively large, for example 5 mm. Additionally the apparatus comprises adjustment members 703 and 704 between the layers 701 and 702. The adjustment members 703 and 704 are attached to the first layer 701. In the first configuration the first layer 701 and the adjustment members 703 and 704 are configured to freely slide relative to the second layer 702. Thereby the apparatus is flexible.

Figure 7B:
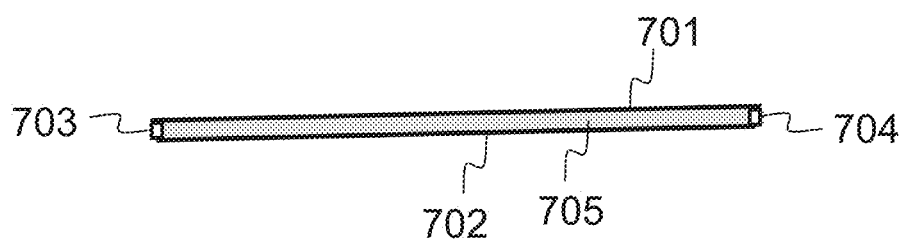
FIG. 7B shows an apparatus according to an embodiment of the invention in a second configuration.

FIG. 7B shows the apparatus of FIG. 7A in a second configuration. Now the adjustment members 703 and 704 are configured to forbid movement of the first layer 701 in relation to the second layer 702 thereby making the apparatus structure rigid or at least restricting flexibility of the apparatus.

Figure 7C:
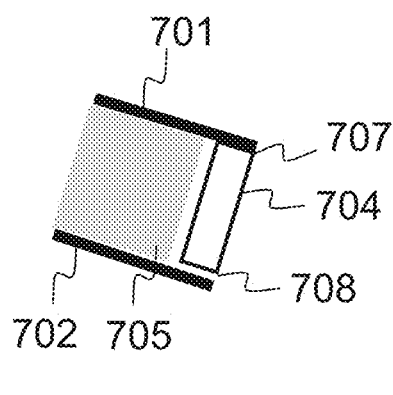
FIG. 7C shows an enlarged detail of apparatus of FIG. 7A.

FIG. 7C shows an enlarged detail of apparatus of FIG. 7A. The adjustment member 704 is firmly attached to the first layer 701 with a connection 707. The other end 708 of the adjustment member 704 is free and can freely slide relative to the second layer 702.

Figure 7D:
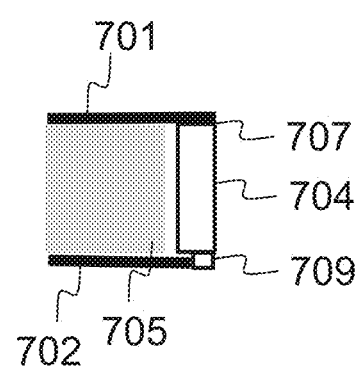
FIG. 7D shows an enlarged detail of apparatus of FIG. 7B.

FIG. 7D shows an enlarged detail of apparatus of FIG. 7B. Now the adjustment member 704 is attached to the second layer 702 with a connection 709 thereby restricting movement of the layers 701 and 702 relative to each other and thus flexibility of the apparatus. In an example embodiment the adjustment member 704 is a gripping mechanism that can be attached to the second layer 702. In an example embodiment the adjustment member 704 is a hook that can be attached to the second layer 702. In an example embodiment the adjustment member 704 comprises a moving or sliding part that can be slid to a position in which it prevents movement of the second layer 702 in relation to the first layer 701. In an example embodiment the sliding part prevents the second layer 702 from sliding outwards in relation to the first layer 701.

In an example embodiment the structure of the apparatus of FIGS. 7A-7D is such that it is possible to bend the apparatus in opposite directions, e.g. upwards and downwards. In an example embodiment the structure is two-sided. In an example embodiment the apparatus is bendable in opposite directions relative to the same axle.

In yet another example embodiment two flexible layers of an apparatus are bind together from all edges of the layers with an elastic connection. The apparatus comprises an adjustment member configured to stay flat in the flexible (first) configuration and to bloat the center of the apparatus in a rigid (second) configuration. One of the adjustment members discussed above in connection to other embodiments may be used in this connection.

In an example embodiment there is only one flexible layer instead of two layers.

FIG. 8 shows an apparatus according to an embodiment of the invention in a second configuration. The apparatus can be the apparatus 101 of FIGS. 1A and 1B or some other apparatus.

The apparatus comprises a first flexible layer 801 and an adjustment member 804 behind the layer 801. The adjustment member 804 is positioned such that it bends the first layer 801 to make the apparatus rigid or at least to restrict flexibility of the apparatus.

In an example embodiment the adjustment member is a bendable strip or ribbon. I.e. the adjustment member is bent to bend the flexible layer(s) thereby making the flexible layer(s) rigid. Such bendable adjustment member may be a metal strip or ribbon. In an example embodiment the bendable strip bends in response to electric currency being applied to the strip. Such effect may be based on heat expansion. In an example embodiment a metal strip that expands and becomes longer in response to electric currency being applied to it is attached to a flexible layer of an apparatus. The flexible layer is such that it does not expand and thereby the flexible layer bends as the metal strip expands and the apparatus becomes rigid or at least flexibility of the apparatus is restricted. In another example embodiment a piezoelectric element is used as the adjustment member for providing a similar effect.

FIG. 9A shows an apparatus according to an embodiment of the invention in a first configuration. The apparatus can be the apparatus 101 of FIGS. 1A and 1B or some other apparatus The apparatus comprises a first flexible layer 901 and adjustment members 903 and 904 behind the layer 901. In the shown first configuration the adjustment members 903 and 904 are flat behind the layer 901 and the apparatus is flexible. The adjustment members 903 and 904 are arranged perpendicularly in relation to one another so that rigidity in two dimensions can be provided.

FIG. 9B shows the apparatus of FIG. 9A in a second configuration. The adjustment members 903 and 904 have been turned 90 degrees so that the apparatus becomes rigid or at least has restricted flexibility. In an example embodiment the adjustment members 903 and 904 bend the first layer 901 to make it rigid. In another example, the first layer is not necessarily bent, but the perpendicular positioning of the adjustment members 903 and 904 makes the apparatus rigid or at least restricts flexibility of the apparatus. A technical effect that may be achieved with this structure is that rigidity in two directions can be provided.

In an example embodiment flexibility of the apparatus is manually controllable. A technical effect of such embodiment is that the user can make the decision to use the apparatus in flexible/rigid configuration irrespective of the operating mode of the apparatus. In an example embodiment the adjustment member is manually controllable/movable. In an embodiment there is a manual handle that is operable by a user of the apparatus. In another example the adjustment member is moved using an electro mechanic component, such as a servo motor.

In an alternative embodiment flexibility of the apparatus is automatically controlled responsive to operating mode of the apparatus. In an example the apparatus is set to flexible configuration in a transport mode and to rigid configuration in use mode (e.g. photography, picture browsing, message typing etc). In an example the apparatus is set to flexible configuration in a game mode. This suits for example games or other applications that are controlled by bending the apparatus.

Figure 10:
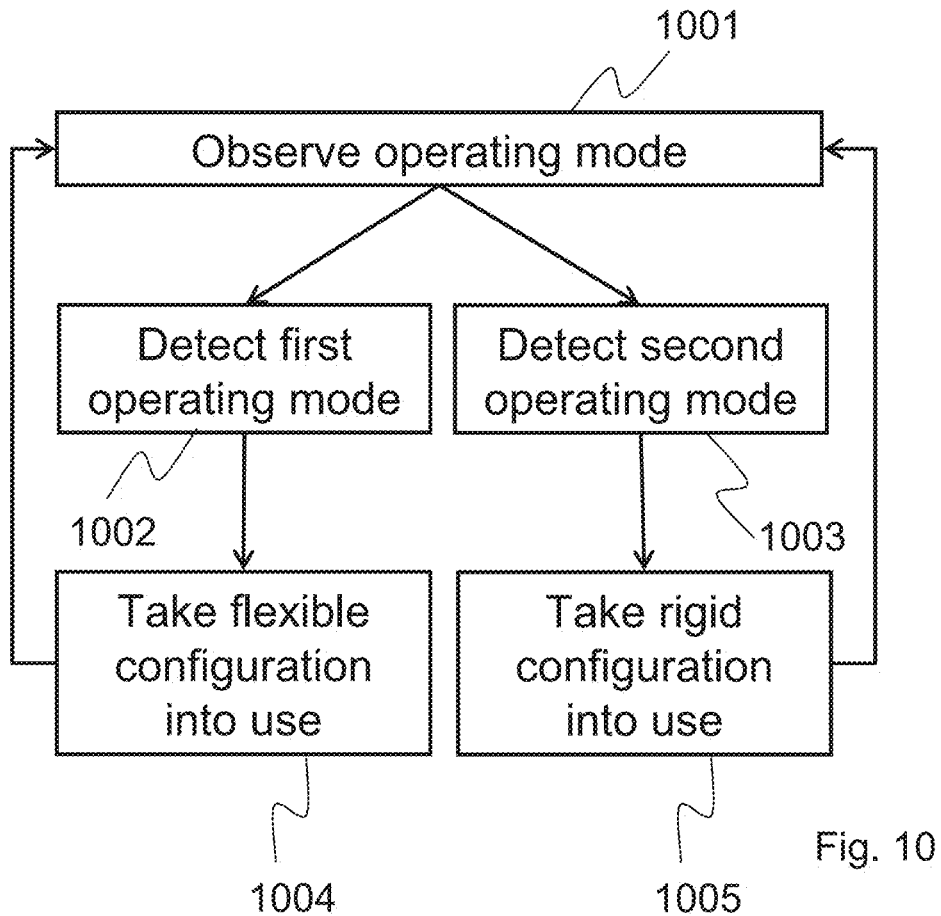
FIG. 10 shows a rough flow diagram showing a method in accordance with an embodiment of the invention.

FIG. 10 shows a rough flow diagram showing a method in accordance with an embodiment of the invention.

In phase 1001 operating mode of the apparatus is observed. In phase 1002 a first operating mode is detected and responsive to that a flexible configuration is taken into use in phase 1004. In phase 1003 a second operating mode is detected and responsive to that a rigid configuration is taken into use in phase 1005. From phases 1004 and 1005 the process return to phase 1001.

Figure 11:
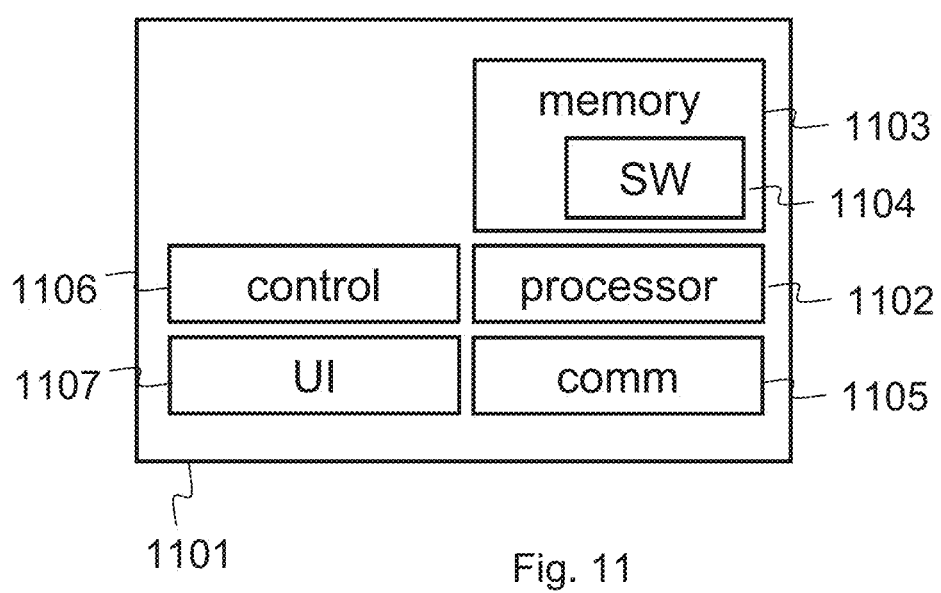
FIG. 11 shows a block diagram of an apparatus according to an embodiment of the invention.

FIG. 11 shows a block diagram of an apparatus 1101 according to an embodiment of the invention. The apparatus is for example the apparatus of one of FIGS. 1-9.

The general structure of the apparatus 1101 comprises a communication interface module 1105, a processor 1102 coupled to the communication interface module 1105, and a memory 1103 coupled to the processor 1102. The apparatus further comprises software 1104 stored in the memory 1103 and operable to be loaded into and executed in the processor 1102. The software 1104 may comprise one or more software modules and can be in the form of a computer program product. The apparatus 1101 further comprises a user interface controller 1107 coupled to the processor 1102 and may include also a rechargeable battery for powering up the apparatus 1101.

The communication interface module 1105 may be, e.g., a radio interface module, such as a WLAN, Bluetooth, GSM/GPRS, CDMA, WCDMA, LTE (Long Term Evolution), LPRF, or wifi radio module. The communication interface module 1105 may support one radio interface technology or a plurality of technologies and there may be one or more of these modules.

The processor 1102 may be, e.g., a central processing unit (CPU), a microprocessor, a digital signal processor (DSP), a graphics processing unit, an application specific integrated circuit (ASIC), a field programmable gate array, a microcontroller or a combination of such elements. The apparatus 1101 may comprise a plurality of processors.

The memory 1103 may be for example a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like.

The apparatus 1101 may comprise a plurality of memories.

The user interface controller 1107 may comprise circuitry for receiving input from a user of the apparatus 1101, e.g., via a keyboard, graphical user interface, speech recognition circuitry, or an accessory device, such as a headset, and for providing output to the user via, e.g., a graphical user interface or a loudspeaker.

Further the apparatus 1101 comprises a control module 1106 configured to control flexibility of the apparatus 1101. The control module 1106 may comprise some electro mechanical components and may operate according to instructions given by a computer program stored in memory 1103 and run by the processor 1102.

Without in any way limiting the scope, interpretation, or application of the claims appearing below, certain technical effects of one or more of the example embodiments disclosed herein are listed in the following: A technical effect is low cost structure. Expensive materials or complicated electro mechanics are not necessarily needed. Instead a simple mechanical structure can be used. Another technical effect is that flexible and rigid configuration are provided in single apparatus.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

If desired, the different functions discussed herein may be performed in a different order and/or concurrently with each other. Furthermore, if desired, one or more of the above-described functions may be optional.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:
1. A flexible electronic apparatus, comprising:
a processor;
at least one memory, the at least one memory having computer program code stored thereon;
a communication interface for communicating data over at least one radio frequency connection;
a user interface for receiving input from, and displaying output to, a user of the apparatus;
a first flexible layer;
a second flexible layer;
a control module; and
at least one adjustment member that resides between the first flexible layer and the second flexible layer and is attached to the first flexible layer,
wherein the adjustment member is movable between a first configuration and a second configuration in response to operation of the control module to control flexibility of the apparatus;
wherein in the first configuration, the adjustment member is configured to allow flexibility of the apparatus, and in the second configuration, the adjustment member is configured to restrict flexibility of the apparatus; and
wherein the adjustment member is configured to forcedly increase distance between the first flexible layer and the second flexible layer as the adjustment member is moved from the first configuration to the second configuration.

2. The apparatus of claim 1, wherein in the second configuration, the adjustment member is configured to make at least one dimension of the first flexible layer rigid.

3. The apparatus of claim 1, wherein the first flexible layer and the second flexible layer are at least partially connected to each other with an elastic connection.

4. The apparatus of claim 1, wherein the adjustment member is a mechanical element.

5. The apparatus of claim 1, wherein the adjustment member is an adjustment bar.

6. The apparatus of claim 1, wherein the adjustment member is an adjustment snippet.

7. The apparatus of claim 1, wherein the adjustment member is a pressure bag.

8. The apparatus of claim 1, wherein the adjustment member is a bendable strip.

9. The apparatus of claim 1, wherein the apparatus comprises more than one adjustment members.

10. The apparatus of claim 1, wherein in the second configuration, the adjustment member is configured to bend the first flexible layer.

11. The apparatus of claim 1, wherein the adjustment member is configured to adjust distance between the first flexible layer and the second flexible layer.

12. The apparatus of claim 1, wherein
in the first configuration, the adjustment member is configured to allow movement of the second flexible layer in relation to the first flexible layer, and
in the second configuration, the adjustment member is configured to restrict movement of the second flexible layer in relation to the first flexible layer.

13. The apparatus of claim 1, wherein the apparatus comprises elastic seaming between the first flexible layer and the second flexible layer, and wherein
in the first configuration, the adjustment member is configured to allow movement of the first flexible layer relative to the second flexible layer, and
in the second configuration, the adjustment member is configured to attach the first flexible layer and the second flexible layer to each other so that movement of the first flexible layer relative to the second flexible layer is restricted.

14. The apparatus of claim 1, wherein the adjustment member is manually movable between the first configuration and the second configuration.

15. The apparatus of claim 1, wherein the control module is configured to automatically move the adjustment member between the first and the second configurations depending on an operating mode of the apparatus.

16. The apparatus of claim 15, wherein the control module comprises electro-mechanical components.

17. The apparatus of claim 16, wherein the at least one memory and the computer program code are configured to, when executed by the processor, detect the operating mode of the apparatus and cause the electro-mechanical components to move the adjustment member between the first and second configurations depending on the detected operating mode of the apparatus.

18. The apparatus of claim 17, wherein the detected operating mode is at least one of a transport mode and a use mode, and wherein the at least one memory and the computer program code are configured to, when executed by the processor, cause the electro-mechanical components to move the adjustment member to the first configuration when the detected operating mode is the use mode, and to move the adjustment member to the second configuration when the detected operating mode is the transport mode.

19. The apparatus of claim 17, wherein the detected operating mode is a gaming mode, and wherein the at least one memory and the computer program code are configured to, when executed by the processor, cause the electro-mechanical components to move the adjustment member to the second configuration in response to detecting that the operating mode is the gaming mode.

* * * * *